United States Patent
Thomas

[11] Patent Number: 6,050,651
[45] Date of Patent: Apr. 18, 2000

[54] VENT VALVE AND METHOD OF OPERATION THEREOF

[75] Inventor: Barry David Thomas, Bradford, United Kingdom

[73] Assignee: Wabco Automotive UK Limited, Leeds, United Kingdom

[21] Appl. No.: 09/047,973

[22] Filed: Mar. 25, 1998

[30] Foreign Application Priority Data

Mar. 26, 1997 [GB] United Kingdom .................. 9706227

[51] Int. Cl.$^7$ .................................................. B60T 11/26
[52] U.S. Cl. ..................... 303/86; 188/352; 267/64.28; 55/DIG. 17; 96/108; 96/115
[58] Field of Search .................. 303/84.2, 84.1, 303/86; 188/352; 267/4.28; 55/DIG. 17; 96/108, 115, 118

[56] References Cited

U.S. PATENT DOCUMENTS 4,552,412 11/1985 Balukin et al. ............................ 303/67
5,722,744 3/1998 Kupfer et al. .......................... 303/189

*Primary Examiner*—Christopher P. Schwartz
*Assistant Examiner*—Bradley King
*Attorney, Agent, or Firm*—Stroock & Stroock & Lavan LLP

[57] ABSTRACT

Air braking system of vehicles usually have a piston compressor (C) and a desiccant (D) for drying the compressor output air. The desiccant is periodically regenerated by downstream air from e.g. a reservoir (R). When a compressor is brought on load, the initial charge of air may be oil laden. The invention provides a delay mechanism to permit such initial charge of air to pass directly to exhaust.

15 Claims, 2 Drawing Sheets

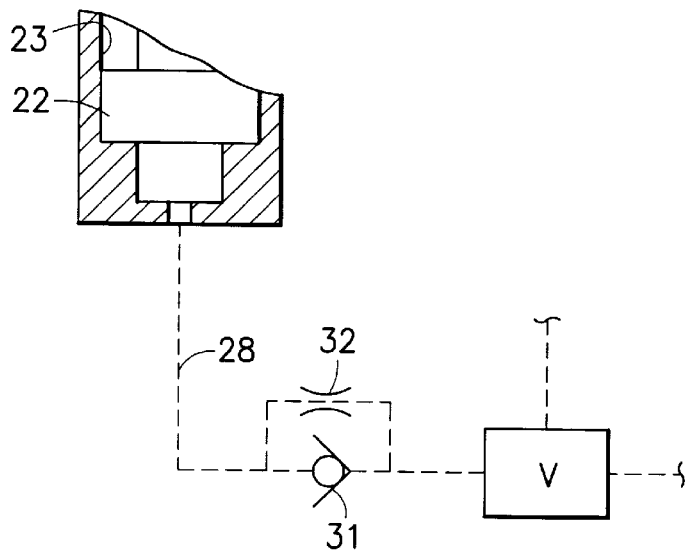
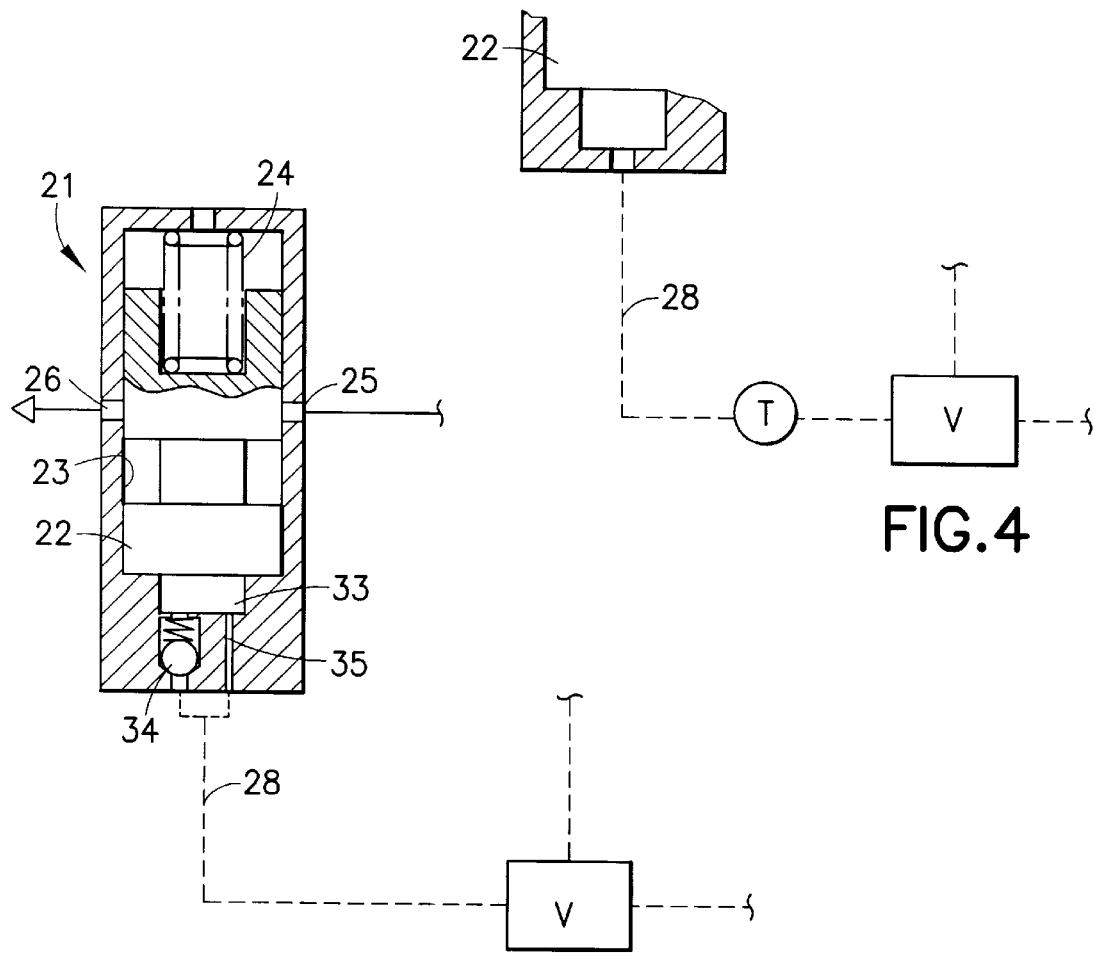

VENT VALVE AND METHOD OF OPERATION THEREOF

This invention relates to a vent valve, and particularly to a vent valve for a vehicle air braking system.

Air braking systems are typically found on heavy commercial vehicles. They usually comprise a compressor, a demand valve, one or more reservoirs and a plurality of actuators for the vehicle wheel brakes. One of the more useful additions to a basic air braking system is an air dryer. An air dryer typically comprises a canister of desiccant downstream of the compressor and through which all air is passed to the system. In time the desiccant becomes less effective as moisture is absorbed and it is necessary to regenerate by passing dry air through the desiccant in the reverse direction, and exhausting the moist air through a vent valve. Regeneration is carried out when the compressor is off-load, and uses dry air from the system volume or from a dedicated purge tank downstream of the air dryer. The vent valve is opened by a control signal, usually a positive pressure, at the same time as the usual control valve takes the compressor off-load. When the compressor is placed on-load the control signal ceases and the vent valve closes, thus permitting air to pass through the desiccant in the usual direction. Such an air dryer system is conventional.

The compressor of an air braking system is generally driven by the vehicle engine and is often an oil lubricated piston pump; lubrication may be by oil from the engine crankcase. When off-load, crankcase pressure may cause oil to be forced past the piston rings of a piston pump into the compression chamber where it accumulates. As soon as the compressor comes on load the initial charge of pressurised air takes up the oil, and thus oil laden air may foul the desiccant rendering it useless. In a short time the entire desiccant volume may become fouled, and replacement of the desiccant is the only immediate solution. For this reason desiccant is usually provided in replaceable canisters as a service item.

The long term solution is to replace the compressor, but in many cases the compressor is otherwise serviceable and thus a preferred solution is to deal with the initial oil laden air as the compressor comes on-load.

According to a first aspect of the invention there is provided a vehicle air braking system having in series a compressor, a desiccant chamber, a reservoir for air under pressure, a demand valve and actuators of wheel brakes, the system further including control means and a vent valve between the compressor and desiccant chamber, said control means being operable to take said compressor on and off load and to respectively close and open said vent valve whereby when the compressor is off-load said vent valve is opened to permit air in said reservoir to exhaust through said desiccant chamber, the system further including delay means to delay closure of said vent valve when said control means brings said compressor on load.

Such an arrangement permits the initial charge of pressurised air, which may be oil laden, to pass through the vent valve to exhaust. The vent valve is preferably opened by the presence of, and closed by the absence of a fluid pressure signal. The delay means may comprise a fluid restrictor to reduce the rate of decay of said pressure signal. Alternatively the vent valve may be opened by the absence of a pressure signal, and a restrictor incorporated to delay the rise of a closing pressure signal.

Alternatively the vent valve may include a valve member movable between open and closed conditions, and the delay means may comprise a dashpot operable on the valve member to reduce the speed of movement thereof in the closing direction. The dashpot may be electronic or hydraulic.

In a further alternative, the delay means may comprise a timer to delay closure of the vent valve for a predetermined period after said compressor has been brought on-load. The timer may be fluid operated, mechanical or electronic. The delay means may impose a variable time delay.

According to a second aspect of the invention there is provided a method of permitting the initial charge of air from a piston compressor to pass to exhaust, comprising the steps of:

a) connecting the outlet of the compressor to exhaust when the compressor is off load;

b) connecting the outlet of the compressor to a consumer when the compressor is on load; and c) providing delay means to delay the connection of the outlet of the compressor to a consumer for a predetermined period after the compressor is brought on load.

The invention provides an inexpensive solution utilizing existing hydraulic components.

Other features of the invention will be apparent from the following description of several preferred embodiments described by way of example only with reference to the accompanying drawings in which:

FIG. 2 illustrates a first embodiment of the invention;

FIG. 3 illustrates a second embodiment of the invention;

FIG. 4 illustrates a third embodiment of the invention.

Figure 1:
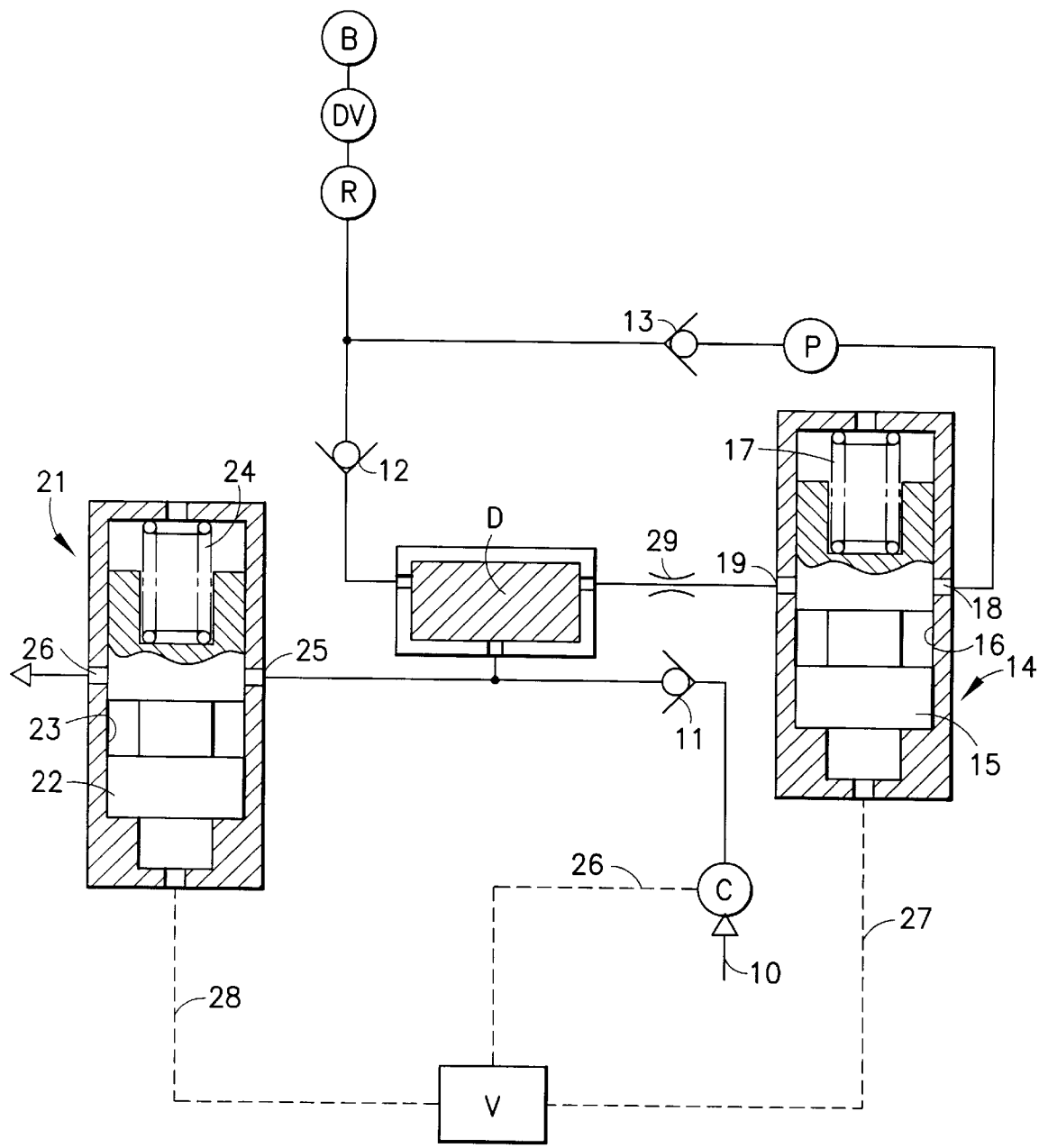
FIG. 1 is a schematic diagram of a typical air brake installation.

With reference to FIG. 1, a simplified air brake system of a vehicle comprises a compressor C which pumps atmospheric air 10 through a non-return valve 11, desiccant chamber D and non-return valve 12 to a demand valve DV of a braking system B. An air reservoir R holds a volume of air under pressure. Air under pressure is also fed through non-return valve 13 to a purge reservoir P.

A purge valve 14 has a spool 15 movable in a bore 16 against the effect of return spring 17 to open and close communication between inlet port 18 and outlet port 19. The outlet port 19 is connected to the desiccant chamber D.

A vent valve 21 also comprises a spool 22 movable in a bore 23 against the effect of return spring 24 to open and close communication between an inlet port 25, which is connected to the inlet to desiccant chamber D, and an outlet port 26 which is open to exhaust.

A control valve V is supplied with fluid under pressure from any suitable source, and supplies fluid under pressure to purge valve 14, vent valve 21 and compressor C in the manner to be explained. As illustrated the vent valve 21 and purge valve 14 close communication between respective inlet and outlet ports in the inactive condition.

Other components of an air brake system are not illustrated but are well known in the art.

In operation the compressor C supplies air under pressure to the desiccant chamber, where it is dried, and thence through non-return valves 12 and 13 to the main reservoir R and purge reservoir P. Inlet ports 18 and 25 are closed by the respective spools 15 and 22. The braking system is operated under the action of the demand valve DV.

When the reservoirs R and P are fully charged, and there is no demand on the braking system, a signal produced by conventional means causes the control valve V to supply a signal 26 to the compressor C which takes the compressor off-load. This may be achieved by connecting the outlet port of the compressor to exhaust. Non-return valve 11 ensures pressure is maintained downstream thereof. At the same time the control valve V may supply pressure signals 27,28 to the purge and vent valves 14,21. These signals cause the spools 15,22 to move upward as viewed thus opening communication between the respective inlet and outlet ports. As a result air from the purge tank P exhausts through the desiccant chamber D thereby removing excess moisture and regenerating the desiccant. A restrictor 29 may be provided to ensure that purge air passes relatively slowly through the desiccant chamber D. Non-return valve 11 prevents backflow to the compressor C, and since pressure from the purge reservoir P is no higher than pressure in the main reservoir R, the non-return valve 12 does not open.

After a period of time, or when braking demand is evident, the signal pressures 26,27 and 28 are removed. As a result the compressor C is brought on load, and the spools 15,22 move to the closed condition.

Such an arrangement is known.

FIG. 2 illustrates one embodiment of the present invention. A non-return valve 31 and restrictor 32 are provided to delay decay of pressure signal 28. In operation the rise of signal pressure 28 is rapid, the signal passing through both non-return valve 31 and restrictor 32. Decay of pressure signal 28 is however through restrictor 32 only since non-return valve 31 is held closed. Accordingly the vent valve 21 closes after purge valve 14, and after compressor C is brought on load. The effect is that the initial output from compressor C, which may be oil laden, passes directly to exhaust through vent valve 21. When the vent valve closes air under pressure passes through the desiccant chamber D in the usual way. The delay in decay of signal pressure 28 may be varied in any conventional manner, for example by changing the size of the restrictor 32.

FIG. 3 illustrates a second embodiment of the invention in which vent valve 21 is provided with an integral dashpot 33 having a non-return valve 34 and restrictor 35. Operation of this arrangement is the same as the second embodiment, the restrictor delaying decay of signal pressure. Other kinds of dashpot are possible, and may comprise a separate component mechanically linked to the spool 22 in any suitable manner.

A third embodiment of the invention is illustrated in FIG. 4. A timer T is included to control the decay of pressure signal 28 such that a period elapses between the control valve permitting decay of the signal 28, and decay occurring in practice. The timer T car be of any suitable kind, and may be for example fluid operated, mechanical or electrical. Furthermore where the control valve V is electronically controlled, for example by a microprocessor, the time delay can be programmed into the control logic. Such a time delay can be variable according to other system parameters or operating conditions. Furthermore the time delay can be set to suit a particular installation or vehicle type.

The embodiments described above may be used in conjunction to achieve a desired effect, or separately as described.

Such arrangements enable the initial volume of pressurized air to pass from the compressor to exhaust, thereby reducing the risk that oil laden air will foul the desiccant in chamber D. The delayed closing of the vent valve is momentary, and does not significantly affect operation of the braking system.

Although the invention has been described with reference to spool valves 14,21 many other kinds of valve are possible within the scope of the invention.

What is claimed is:

1. A vehicle air braking system having in series a compressor, a desiccant chamber, a reservoir for air under pressure, a demand valve and actuators of wheel brakes, the system further including control means and a vent valve between the compressor and desiccant chamber, said control means being operable to take said compressor on and off load and to respectively close and open said vent valve whereby when the compressor is off-load said vent valve is opened to permit air in said reservoir to exhaust through said desiccant chamber, the system further including delay means to delay closure of said vent valve when said control means brings said compressor on load.

2. A system according to claim 1 wherein said vent valve is opened by the presence of, and closed by the absence of a fluid pressure signal.

3. A system according to claim 2 wherein said delay means comprises a fluid restrictor to reduce the rate of decay of said pressure signal.

4. A system according to claim 1 wherein said vent valve includes a valve member movable between open and closed conditions, said delay means comprising a dashpot operable on the valve member to reduce the speed of movement thereof in the closing direction.

5. A vehicle air braking system having in series a compressor, a desiccant chamber, a reservoir for air under pressure, a demand valve and actuators of wheel brakes, the system further including control means and a vent valve between the compressor and desiccant chamber, said control means being operable to take said compressor on and off load and to respectively close and open said vent valve whereby when the compressor is off-load said sent valve is opened to permit air in said reservoir to exhaust through said desiccant chamber, the system further including delay means to delay closure of said vent valve when said control means brings said compressor on load, said delay means comprising a timer to delay closure of the vent valve for a predetermined period after said compressor has been brought on-load.

6. A system according to claim 5 wherein said timer is hydraulic.

7. A system according to claim 5 wherein said timer is mechanical.

8. A system according to claim 5 wherein said timer is electronic.

9. A system according to claim 1 wherein said delay means is adapted to impose a variable time delay.

10. An air system having in series a compressor, a desiccant chamber, a reservoir for air under pressure, a demand valve and an air consumer, the system further including control means and a vent valve between the compressor and desiccant chamber, said control means being operable to take said compressor on and off load and to respectively close and open said vent valve whereby when the compressor is off-load said vent valve is opened to permit air in said reservoir to exhaust through said desiccant chamber, the system further including delay means to delay closure of said vent valve when said control means brings said compressor on load.

11. A system according to claim 10 wherein said vent valve is opened by the presence of, and closed by the absence of a fluid pressure signal.

12. A system according to claim 11 wherein said delay means comprises a fluid restrictor to reduce the rate of decay of said pressure signal.

13. A system according to claim 10 wherein said vent valve includes a valve member movable between open and closed conditions, said delay means comprising a dashpot operable on the valve member to reduce the speed of movement thereof in the closing direction.

14. An air system having in series a compressor, a desiccant chamber, a reservoir for air under pressure, a demand valve and an air consumer, the system further including control means and a vent valve between the compressor and desiccant chamber, said control means being operable to take said compressor on and off load and to respectively close and open said vent valve whereby when the compressor is off-load said vent valve is opened to permit air in said reservoir to exhaust through said desiccant chamber, the system further including delay means to delay closure of said vent valve when said control means brings said compressor on load, said delay means comprising a timer to delay closure of the vent valve for a predetermined period after said compressor has been brought on-load.

15. A system according to claim 14 wherein said delay means is adapted to impose a variable time delay.

* * * * *